(12) United States Patent
Murakami

(10) Patent No.: US 7,979,719 B2
(45) Date of Patent: Jul. 12, 2011

(54) DATA AUTHENTICATION METHOD AND DATA AUTHENTICATION SYSTEM

(75) Inventor: Yutaka Murakami, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1044 days.

(21) Appl. No.: 11/802,983

(22) Filed: May 29, 2007

(65) Prior Publication Data
US 2008/0010462 A1    Jan. 10, 2008

(30) Foreign Application Priority Data

Jul. 10, 2006  (JP) ................................. 2006-189696

(51) Int. Cl.
*G06F 11/30* (2006.01)
*G06F 7/04* (2006.01)
*H04L 9/00* (2006.01)

(52) U.S. Cl. ........ 713/187; 713/188; 713/189; 713/190; 713/191; 713/192; 726/26; 726/27; 726/28; 726/29; 726/30

(58) Field of Classification Search ................. 713/187
See application file for complete search history.

(56) References Cited

U.S. PATENT DOCUMENTS
2003/0084298 A1 * 5/2003 Messerges et al. .......... 713/176

FOREIGN PATENT DOCUMENTS
JP    2006-74421    3/2006

* cited by examiner

*Primary Examiner* — Longbit Chai
(74) *Attorney, Agent, or Firm* — Nixon & Vanderhye, PC

(57) ABSTRACT

A storage means which can be accessed by an authentication apparatus stores content data, a first digest table including primary digest values corresponding to a plurality of data portions constituting the content data, a second digest table including secondary digest values corresponding to a plurality of data portions of the first digest table, and a digital signature generated from the second digest table. In a first reading step, the second digest table and the digital signature are read out from the storage means into a memory of the authentication apparatus. In a first authentication step, the authenticity of the content data is verified using the digital signature read out into the memory and the second digest table read out into the memory.

19 Claims, 8 Drawing Sheets

DATA AUTHENTICATION METHOD AND DATA AUTHENTICATION SYSTEM

CROSS REFERENCE TO RELATED APPLICATION

The disclosure of Japanese Patent Application No. 2006-189696, filed Jul. 10, 2006, is incorporated herein by reference.

FIELD

The technology herein relates to a data authentication method, and more particularly, to a data authentication method for authenticating data which is provided from an authentic source.

BACKGROUND AND SUMMARY

Patent Document 1 (Japanese Laid-Open Patent Publication No. 2006-74421) describes a technique of verifying the authenticity of program data stored in an information storage medium. In this technique, the information storage medium stores content data and a content hash table. The content hash table is data including hash values (digest values) corresponding to respective pieces of data (subdivided content data) which are obtained by subdividing the content data. An information processing apparatus which reads the content data reads the subdivided content data and the digest value, and checks a hash value calculated from the subdivided content data against the read hash value. Thereby, the information processing apparatus can execute the hash value calculating process and the hash value checking process for each piece of subdivided content data. Therefore, the information processing apparatus, when reading a part of the content data, needs to perform the checking process only with respect to a part which is to be actually read out, whereby the authenticity of the content data can be efficiently verified.

Note that the information storage medium stores a content certificate which is obtained by using a digital signature to encrypt content hash values calculated from the content hash table. By performing the checking process using the content certificate, even when the content data and the corresponding hash values are tampered, the authenticity of the content data can be correctly verified. Specifically, by checking a content hash value obtained by decrypting the content certificate against a content hash value obtained from the content hash table read from the information storage medium, the authenticity of the content data can be verified.

In Patent Document 1, the information processing apparatus, when verifying the authenticity of data in the information storage medium using the content certificate, calculates content hash values from the content hash table. Therefore, the information processing apparatus needs to read the whole content hash table into a memory. Therefore, as the data size of the content hash table increases, the capacity of the memory which should be provided in the information processing apparatus needs to be increased. Therefore, when it is difficult to provide a memory having a sufficiently large capacity (e.g., when the information processing apparatus is a mobile apparatus or the like), a memory capacity required for authentication may be insufficient. Note that it is contemplated that content data may be subdivided into larger data units so as to reduce the number of hash values, thereby reducing the data size of the content hash table. In this method, however, the efficiency of the checking process when a part of the content data is read is poor.

Therefore, example embodiments provide a data authentication method capable of efficiently performing the checking process and reducing a memory capacity required for authentication.

Certain example embodiments may have the following features. Note that reference numerals, additional descriptions and the like inside parentheses in this section indicate correspondence to embodiments described below for the sake of easy understanding, and are not limiting.

A first aspect of certain example embodiments is directed to a method for use in an authentication apparatus (a game apparatus 10) for authenticating content data (1). The authentication apparatus can access a storage means storing the content data, a first digest table (2), a second digest table (3), and a digital signature (4). The first digest table includes primary digest values which are digest values corresponding to content data portions constituting the content data. The second digest table includes secondary digest values which are digest values corresponding to portions constituting the first digest table. The digital signature is generated from a secondary digest value included in the second digest table. The authentication method comprises a first reading step (S11) and a first authentication step (S12 to S14). The first reading step reads out the second digest table and the digital signature from the storage means into a memory (RAM 24) of the authentication apparatus. The first authentication step verifies the authenticity of the content data using the digital signature read out into the memory and a secondary digest value included in the second digest table read out into the memory.

Note that, in the first aspect, the content data includes a plurality of content data portions. A primary digest value is calculated for each content data portion. The first digest table may include primary digest values corresponding to all the content data portions. When the digital signature is generated, data included in the second digest table (e.g., all data included in the second digest table) is subjected to a predetermined operation (a hash function is applied, etc.), for example. For example, the digital signature may be data which is obtained by encrypting, using a predetermined private key, a digest value which has been obtained by applying a predetermined hash function to the data in the second digest table. In this case, in the first authentication step, it may be determined whether or not the data generated by performing the predetermined operation with respect to the data included in the second digest table, matches data obtained by decrypting the digital signature using a public key corresponding to the private key.

In a second aspect based on the first aspect, the secondary digest values are calculated for respective groups each including a plurality of primary digest values. The authentication method further comprises a designation step (S21), a first calculation step (S24), a second authentication step (S25), a second calculation step (S27), and a third authentication step (S28). The designation step designates a content data portion to be read out of the content data portions. The first calculation step calculates, from a group including a primary digest value corresponding to the designated content data portion, a secondary digest value corresponding to the group. The second authentication step verifies the authenticity of the content data by checking the secondary digest value calculated in the first calculation step against a secondary digest value corresponding to the group including the primary digest values corresponding to the designated content data portion. The second calculation step calculates, from the designated content data portion, a digest value of the content data portion, when authentication is successful in the second authentication step. The third authentication step verifies the authenticity of the content data by checking the digest value calculated in the second calculation step against the primary digest value corresponding to the designated content data portion.

Note that, in the second aspect, in the designation step, in response to determination of data to be read out of the data included in the content data (by a technique, such as random access or the like), the authentication apparatus may designate a content data portion including the data to be read out.

A third aspect based on the second aspect, the first authentication step may be executed after the authentication apparatus and the storage means become accessible and before the second authentication step is executed.

A fourth aspect based on the second aspect, a hash function for calculating a primary digest value from the content data portion may be the same as a hash function for calculating a secondary digest value from the first digest table portion.

A fifth aspect based on the fourth aspect, the digital signature may be generated based on a digest value corresponding to a plurality of secondary digest values included in the second digest table. In this case, a hash function for calculating the digest value has a higher security level than that of the hash function for calculating a primary digest value from the content data portion.

Note that, in the fifth aspect, a hash function has a high security level in the following cases:

(a) the number of bits in a process of calculating a hash value in the hash function is relatively large;

(b) the number of bits of a hash value as a calculation of the hash function is relatively large; and (c) the hash function includes encryption (as compared to the hash function without encryption).

A sixth aspect based on the second aspect, a hash function for calculating a secondary digest value from a data portion of the first digest table may have a smaller processing amount for calculation of a digest value than that of a hash function for calculating a primary digest value from a data portion of the content data.

Note that, in the sixth aspect, the processing amount of calculation of a digest value is small in the following cases:

(a) the number of bits in a process of calculating a hash value in the hash function is relatively large;

(b) the number of bits of a hash value as a calculation of the hash function is relatively large; and (c) the hash function includes encryption (as compared to the hash function without encryption).

A seventh aspect based on the first aspect, a hash function used in the first authentication step may have a higher security level than those of a hash function for calculating a secondary digest value from the first digest table portion and a hash function for calculating a primary digest value from the content data portion.

An eighth aspect of certain example embodiments is directed to an authentication apparatus (game apparatus 10) for authenticating content data. The authentication apparatus can access a storage means (memory card 17) storing the content data, a first digest table including primary digest values which are digest values corresponding to content data portions constituting the content data, a second digest table including secondary digest values which are digest values corresponding to first digest table portions constituting the first digest table, and a digital signature generated from a secondary digest value included in the second digest table. The authentication apparatus comprises a reading means (a CPU core 21 for executing step S11, etc.; only step numbers are described in similar cases in this paragraph) and an authentication means (S12 to S14). The reading means reads out the second digest table and the digital signature from the storage means into a memory (RAM 24) of the authentication apparatus. The authentication means verifies the authenticity of the content data using the digital signature read out into the memory and a secondary digest value included in the second digest table read out into the memory.

A ninth aspect of certain example embodiments is directed to a computer readable storage medium storing an authentication process program executed by a computer (CPU core 21, etc.) of an authentication apparatus (game apparatus 10) for authenticating content data. The authentication apparatus can access a storage means storing the content data, a first digest table including primary digest values which are digest values corresponding to content data portions constituting the content data, a second digest table including secondary digest values which are digest values corresponding to first digest table portions constituting the first digest table, and a digital signature generated from a secondary digest value included in the second digest table. The authentication process program causes the computer to execute a reading step (S11) and an authentication step (S12 to S14). The reading step reads out the second digest table and the digital signature from the storage means into a memory of the authentication apparatus. The authentication step verifies the authenticity of the content data using the digital signature read out into the memory and a secondary digest value included in the second digest table read out into the memory.

A tenth aspect of certain example embodiments is directed to a data processing method for generating data to be stored into a storage means. The data processing method comprises a first calculation step (S1), a second calculation step (S2), a digital signature generating step (S3), and a setting step (S4). The first calculation step calculates primary digest values which are digest values corresponding to content data portions constituting content data. The second calculation step calculates secondary digest values which are digest values corresponding to first digest table portions constituting a first digest table including the primary digest values calculated in the first calculation step. The digital signature generating step generates a digital signature from a second digest table including the secondary digest values calculated in the second calculation step. The setting step sets the content data, the first digest table, the second digest table, and the digital signature as data to be stored into the storage means.

An eleventh aspect of certain example embodiments is directed to a computer readable storage medium. The storage medium stores content data, a first digest table including primary digest values which are digest values corresponding to content data portions constituting the content data, a second digest table including secondary digest values which are digest values corresponding to first digest table portions constituting the first digest table, and a digital signature generated from the second digest table.

According to the first and eighth to eleventh aspects, authentication employing a digital signature is performed using the second digest table including digest values of the first digest table, but not the first digest table including digest values of content data. In other words, data to be read out in an authentication process using a digital signature is the second digest table which has a smaller data size than that of the first digest table. Therefore, a memory capacity required for authentication can be reduced as compared to the conventional art. Also, according to the tenth and eleventh aspects, the data structure used in the above-described aspects can be provided.

According to the second aspect, the authentication apparatus confirms not only whether or not the second digest table is tampered, but also whether or not the first digest table and content data are tampered. Therefore, the authenticity of contents can be more correctly verified.

According to the third aspect, after the authenticity of the second digest table is authenticated in the first authentication step, the second and third authentication steps are executed. The second and third authentication steps are authentication processes which are performed based on the assumption that the second digest table is authentic. Therefore, by executing the second and third authentication steps after the first authentication step, authentication in the second and third authentication steps can be correctly performed.

According to the fourth aspect, by causing a hash function for calculating a primary digest value and a hash function for calculating a secondary digest value to be the same, the possibility that the hash function is broken, so that content data is freely tampered, can be reduced as compared to the sixth aspect.

According to the fifth and seventh aspects, by increasing the security level of a hash function used for a digital signature, the possibility that the hash function is broken, so that content data is freely tampered, can be reduced.

According to the sixth aspect, it is possible to reduce a processing amount of the second authentication step as compared to the fourth aspect.

These and other objects, features, aspects and advantages of certain example embodiments will become more apparent from the following detailed description when taken in conjunction with the accompanying drawings.

DETAILED DESCRIPTION (1) Outline

Figure 1:
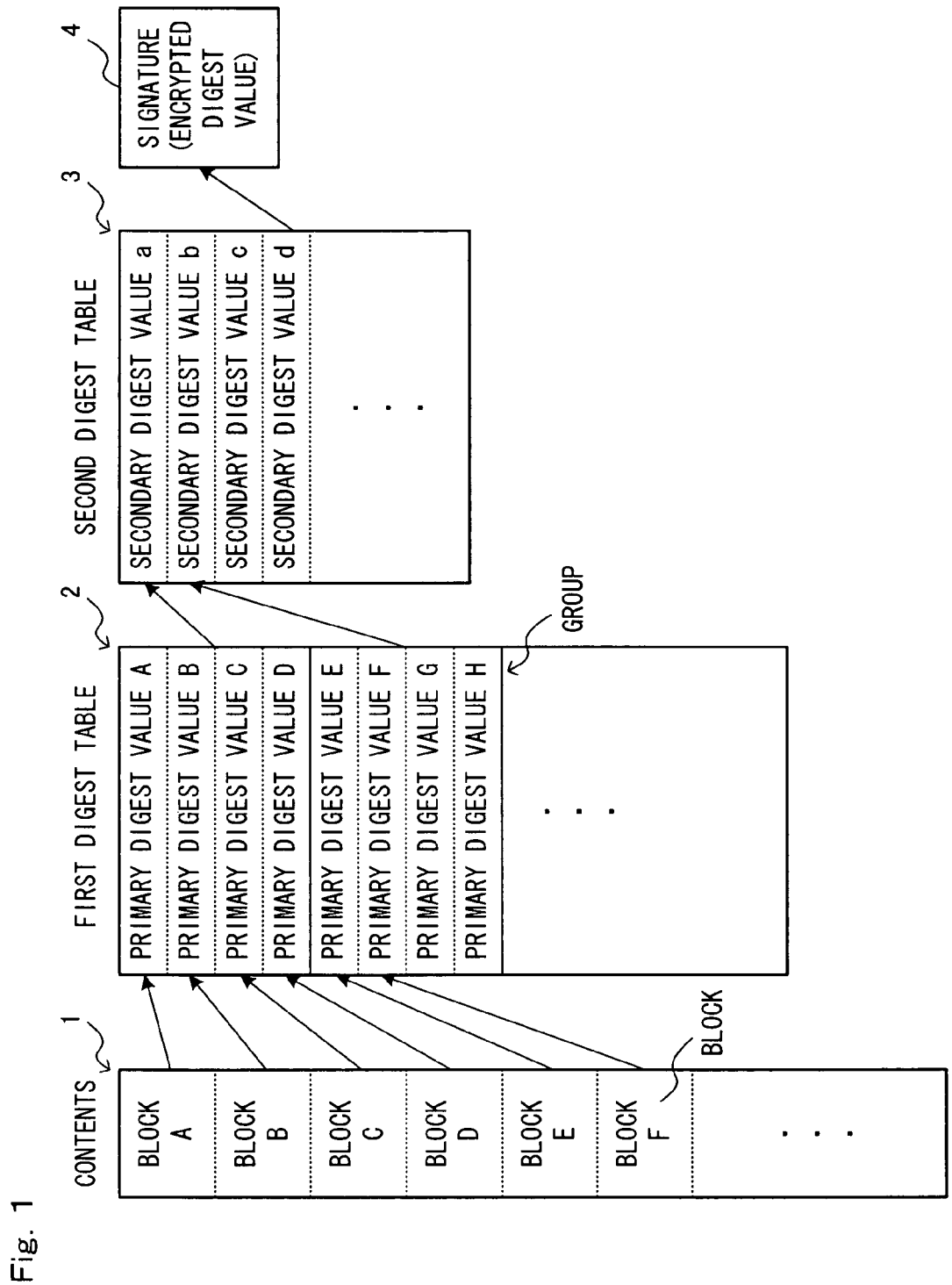
FIG. 1 is a diagram showing a data structure including content data which is to be subjected to an authentication method according to an embodiment.

Firstly, an outline of an authentication method according to an embodiment will be described with reference to FIG. 1. FIG. 1 is a diagram showing a data structure including content data which is to be subjected to the authentication method of this embodiment. The data structure of FIG. 1 includes contents 1, a first digest table 2, a second digest table 3, and a digital signature 4. The data 1 to 4 of FIG. 1 may be provided in the form of a storage medium to the user for the contents 1, or may be provided from a storage means on a server side via a network (e.g., the Internet, etc.) to a reproduction apparatus.

The contents 1 are data which is to be provided to the user, such as a game program, video and/or audio data, text data, or the like. In an example described below, the contents 1 are a game program and data which is used in a game process executed by the game program. In this embodiment, the contents 1 are divided into portions having a predetermined data size. A data read operation or the like is performed in units of the data portions (blocks).

The first digest table 2 is data including digest values (hash values) for the respective data portions constituting the contents 1. In this embodiment, the digest values included in the first digest table 2 are also referred to as "primary digest values" so as to distinguish them from digest values included in the second digest table 3. A primary digest value is calculated for each block of the contents 1. Specifically, a primary digest value is obtained by applying a hash function to a data portion (one block) of the contents 1. The primary digest values included in the first digest table 2 are divided into a plurality of groups. In FIG. 1, four primary digest values enclosed with a solid line constitute one group. The number of primary digest values included in one group is any number of more than one.

The second digest table 3 is data including digest values for the respective data portions constituting the first digest table 2. In this embodiment, the digest values included in the second digest table 3 are also referred to as "secondary digest value" so as to distinguish them from the digest values included in the first digest table 2. A secondary digest value is calculated for each group in the first digest table 2. Specifically, a secondary digest value is obtained by applying a hash function to one group of primary digest values. In FIG. 1, a secondary digest value a is obtained by applying the hash function to a group of primary digest values A to D, and a secondary digest value b is obtained by applying the hash function to a group of primary digest values E to H.

The digital signature 4 is data of a digital signature which is generated from the second digest table 3. Specifically, the digital signature 4 is data which is obtained by applying a predetermined hash function to the secondary digest values included in the second digest table 3 to obtain a digest value and encrypting the digest value using a public key encryption scheme.

Next, an outline of a content authentication method when the data structure of FIG. 1 is employed will be described. Note that authentication of the contents 1 is to verify that the contents 1 is data provided from an authentic source, i.e., that the contents 1 is not tampered by a party other than authentic sources. An authentication process for the contents 1 includes three steps, i.e., first to third authentication processes. The first authentication process is a process of verifying the authenticity of the second digest table 3 using the second digest table 3 and the digital signature 4. Specifically, in the first authentication process, authentication is performed by checking a digest value calculated from the second digest table 3 against a digest value obtained by decrypting the digital signature 4. The second authentication process is a process of verifying the authenticity of one group included in the first digest table 2. Specifically, in the second authentication process, authentication is performed by checking a digest value calculated from the first digest table 2 against a secondary digest value included in the second digest table 3. The third authentication process is a process of verifying the authenticity of one block included in the contents 1. In the third authentication process, authentication is performed by checking a digest value calculated from one block in the contents 1 against a primary digest value included in the first digest table 2.

In the first to third authentication processes, not all data in the first digest table 2 needs to be simultaneously read out into a memory. This is because, in the second authentication process, only one group included in the first digest table 2 is authenticated. Therefore, in this embodiment, a memory area required for the authentication process can be reduced as compared to when all data in the first digest table 2 is simultaneously read out into a memory as in the conventional art.

For example, it is assumed that the data size of the contents 1 is a 256 MB (Mega Bytes), a digest unit (a data size to which a hash function is applied) is 2 KB, and the data size of a digest value is 16 B. In this case, the data size of the first digest table 2 is 2 MB according to expression (1) below.

$$(256[MB]/2[KB]) \times 16[B] = 2[MB] \quad (1)$$

Also, when a secondary digest value is calculated from a group in the first digest table 2, it is assumed that the digest unit is 2 KB and the data size of a digest value is 16 B. In this case, the data size of the second digest table 3 is 16 KB according to expression (2) below.

$$2[MB]/2[KB] \times 16[B] = 16[KB] \quad (2)$$

Note that, when the digest unit or the data size of a digest value can be arbitrarily determined both when a primary digest value is calculated from the contents 1 and when a secondary digest is calculated from the first digest table 2. Therefore, by changing the digest unit or the data size of a digest value as appropriate, the data size of the second digest table 3 can be changed as appropriate. Here, in this embodiment, an authentication apparatus reads out only one group in the first digest table 2 into a memory, while the whole second digest table 3 needs to be read out into a memory (the first to third authentication processes will be described below). In other words, a memory area having the data size of the second digest table 3, i.e., 16 KB, may be provided for the authentication process. In contrast to this, in conventional methods, since the whole first digest table 2 needs to be read out, a memory area of 2 MB needs to be provided for the authentication process. As described above, according to this embodiment, a memory area required for the authentication process can be significantly reduced as compared to the conventional art. In addition, by adjusting the data size of the second digest table 3, the size of a memory area required for the authentication process can be adjusted in consideration of random accessibility and memory capacity.

Hereinafter, the processes of this embodiment will be described in detail. Note that it is hereinafter assumed that contents to be provided to the content user are a game program, the data 1 to 4 of FIG. 1 to be provided to the user are stored in a memory card, and the game program is read out from the memory card into a mobile game apparatus before execution.

(2) Data Generating Process by Content Provider

Figure 2:
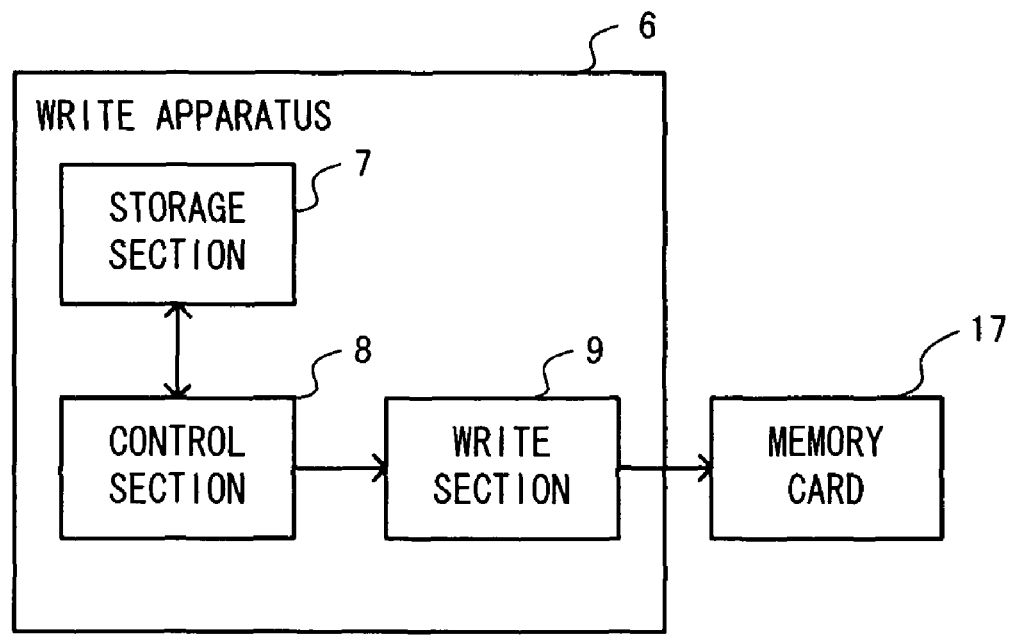
FIG. 2 is a block diagram showing a configuration of a write apparatus for writing data of FIG. 1 into a memory card.

Firstly, a process of generating the data structure of FIG. 1 will be described in detail with reference to FIGS. 2 and 3. FIG. 2 is a block diagram showing a configuration of a write apparatus for writing the data of FIG. 1 into a memory card. In FIG. 2, the write apparatus 6 comprises a storage section 7, a control section 8, and a write section 9. The write apparatus 6 is provided at a provider of the contents 1.

The storage section 7 of FIG. 2 stores the contents 1, a hash function for calculating a digest value, and an encryption key used for generating a digital signature. The control section 8 uses data stored in the storage section 7 to generate the first and second digest tables 2 and 3 and the digital signature 4. The write section 9 can access a memory card 17 which is an exemplary storage medium, and writes data into the memory card 17 in accordance with an instruction from the control section 8.

Figure 3:
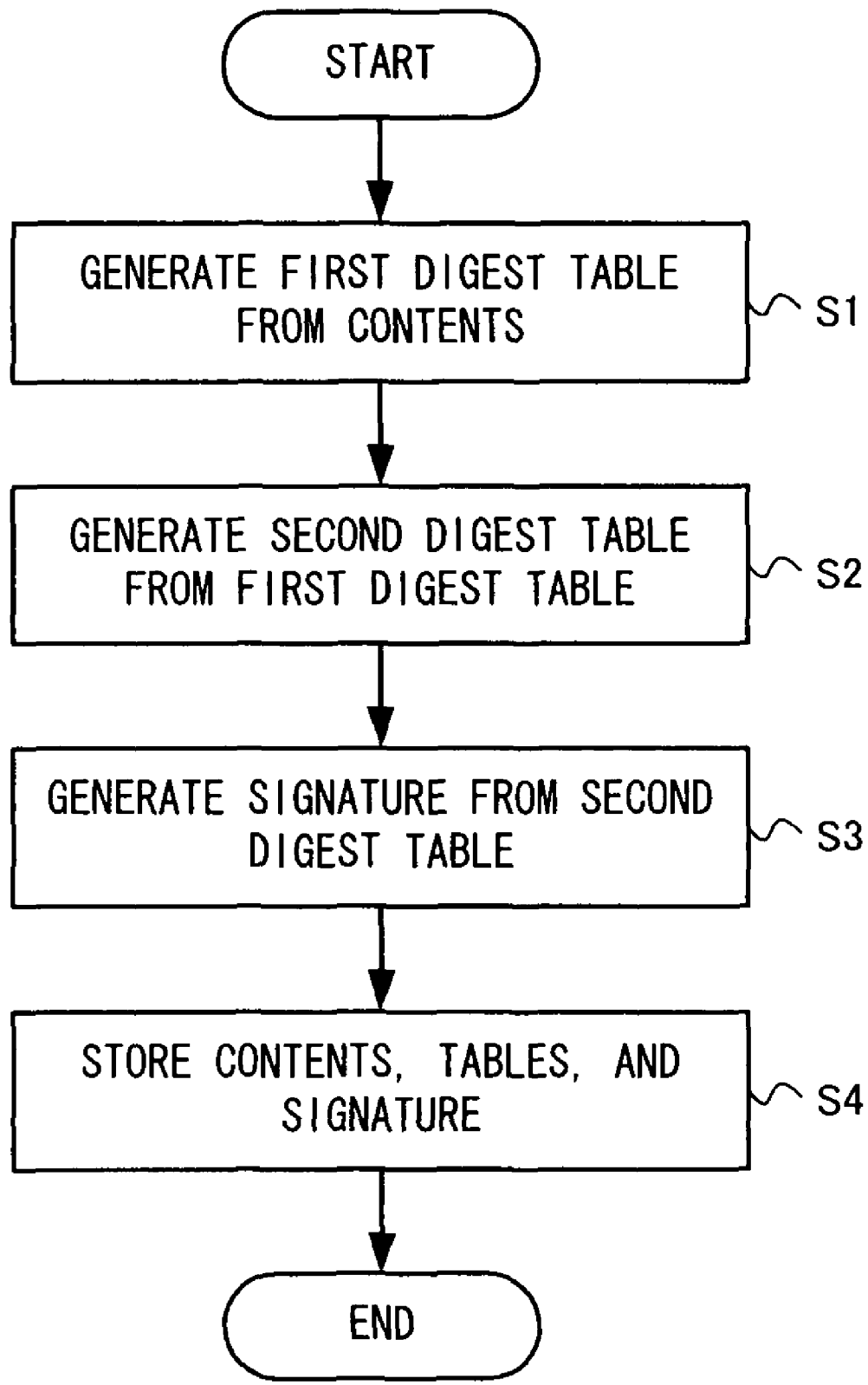
FIG. 3 is a flowchart showing a process of writing the data of FIG. 1 into the memory card.

FIG. 3 is a flowchart showing a process of writing the data of FIG. 1 into the memory card 17. The process of FIG. 3 is executed by the control section 8 of the write apparatus 6. Note that the process of FIG. 3 is typically executed by the control section 8 executing a predetermined data generating program.

In step S1 of FIG. 3, the control section 8 generates the first digest table 2 from the contents 1 stored in the storage section 7. Specifically, a plurality of primary digest values included in the first digest table 2 are calculated. As described above, a primary digest value is calculated for each block included in the contents 1. Specifically, the control section 8 applies to a hash function to the blocks in the contents 1 to calculate the primary digest values corresponding to the respective blocks. Note that the hash function used for calculating the primary digest value is referred to as a first hash function. The first hash function is stored in the storage section 7. The primary digest values calculated in step S1 are stored as the first digest table 2 in the storage section 7.

In step S2, the control section 8 generates the second digest table 3 from the first digest table 2 calculated in step S1. Specifically, a plurality of secondary digest values included in the second digest table 3 are calculated. As described above, a secondary digest value is calculated for each group included in the first digest table 2. Specifically, the control section 8 applies a hash function to the groups in the first digest table 2 to calculate a plurality of secondary digest values corresponding to the respective groups. Note that the hash function used for calculating the secondary digest value is referred to as a second hash function. The second hash function is stored in the storage section 7. In this embodiment, the first hash function and the second hash function are the same. More specifically, in this embodiment, MD-5 (Message Digest 5) is used as the first and second hash functions. The secondary digest values calculated in step S2 are stored as the second digest table 3 in the storage section 7.

In step S3, the control section 8 generates the digital signature 4 from the second digest table 3. Specifically, initially, the control section 8 applies a predetermined hash function for generating a digital signature to the second digest table 3 to calculate a digest value of the second digest table 3. In this embodiment, the digital signature generating hash function is different from the first and second hash functions. Specifically, SHA-1 (Secure Hash Algorithm 1) is used as the digital signature generating hash function. Further, the control section 8 encrypts the calculated digest value using a private key to generate the digital signature 4. The private key is an encryption key which is paired with a public key which is used by a game apparatus which uses the contents 1 (game program), and is stored in the storage section 7. The digital signature 4 thus generated is stored into the storage section 7.

In step S4, along with the contents 1, the first digest table 2, the second digest table 3 and the digital signature 4 generated in steps S1 to S3 are written into the memory card 17. Specifically, the control section 8 instructs the write section 9 to write the data 1 to 4 into the memory card 17. The write section 9 writes the data 1 to 4 into the memory card 17 in accordance with this instruction. Note that the memory card 17 includes a ROM 17*a* and a RAM 17*b* (see FIG. 5). The data 1 to 4 are written into the ROM 17*a*. After step S4, the control section 8 ends the process of FIG. 3.

In this embodiment, the memory card 17 in which the data 1 to 4 are written by steps S1 to S4 is provided from a content provider to a content user. The content user inserts the memory card 17 into a game apparatus 10 shown in FIG. 4 to use the contents (game program) 1 of the memory card 17.

(3) Authentication Process by Content User

Figure 4:
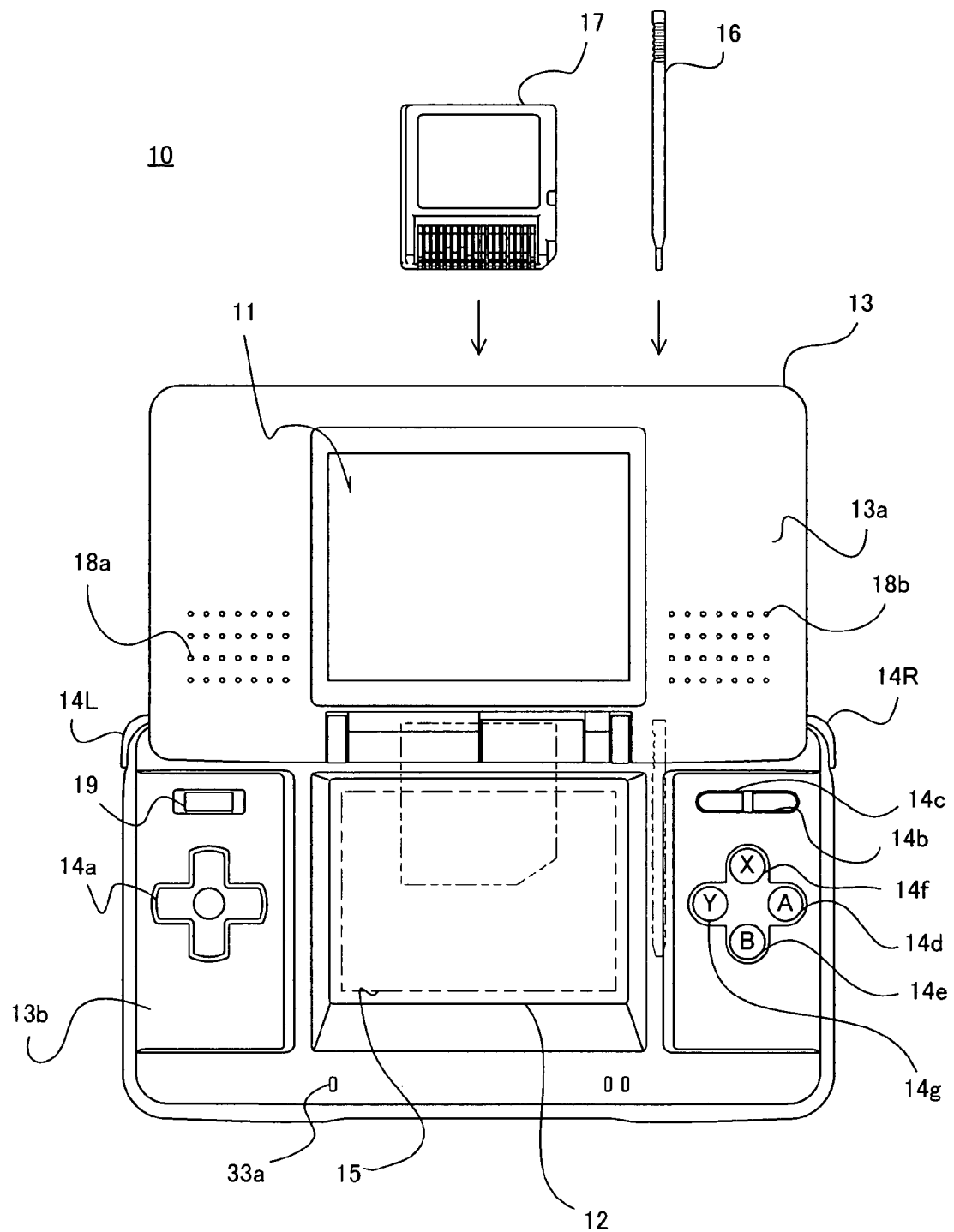
FIG. 4 is an external view of a game apparatus as an example of the authentication apparatus of this embodiment.

Next, an authentication process of the contents 1 performed by the content user will be described in detail with reference to FIGS. 4 to 8. FIG. 4 is an external view of a game apparatus as an example of the authentication apparatus of this embodiment. In FIG. 1, the game apparatus 10 comprises a first LCD (Liquid Crystal Display) 11 and a second LCD 12 as a display means, a housing 13, an operation switch section 14, and a touch panel 15. The memory card 17 is detachably attached to the game apparatus 10.

The housing 13 includes an upper housing 13a and a lower housing 13b. The first LCD 11 is housed in the upper housing 13a, while the second LCD 12 is housed in the lower housing 13b. The first LCD 11 and the second LCD 12 both has a resolution of 256 dots×192 dots. Although LCDs are used as the display devices in the embodiment, any display device may be used, including a display device which employs, for example, EL (Electro Luminescence: electric field light emission), or the like. The display device may have any resolution.

Sound holes 18a and 18b through sound is emitted out from a pair of loudspeakers 30a and 30b are formed in the upper housing 13a.

The lower housing 13b is provided with a slot through which the memory card 17 is inserted. In the lower housing 13b, a cross switch 14a, a start switch 14b, a select switch 14c, an A-button 14d, a B-button 14e, an X-button 14f, a Y-button 14g, an L-button 14L, and an R-button 14R (collectively referred to as an operation switch section 14) are provided as input devices. As an additional input device, a touch panel 15 is attached onto a screen of the second LCD 12. The lower housing 13b is also provided with sound holes 33a around the second LCD 12. A microphone 33 is provided in the vicinity of the sound holes 33a and inside the lower housing 13b. The microphone 33 converts sound entering through the sound holes 33a from the outside of the lower housing 13b, into an electrical signal (audio signal). The lower housing 13b is also provided with a power button 19, and a slot into which a stick 16 is inserted.

The touch panel 15 may be of any type including, for example, a resistance film type, an optical (infrared) type, an electrostatic capacitance coupling type, and the like. The touch panel 15 has a function of outputting coordinate data corresponding to a touch position where the stick 16 touches a surface of the touch panel 15. Although it is hereinafter assumed that a player operates the touch panel 15 using the stick 16, a pen (stylus pen) or a finger can be used instead of the stick 16 so as to operate the touch panel 15. In this embodiment, the touch panel 15 has the same resolution (detection precision) as that of the second LCD 12, i.e., 256 dots×192 dots. Note that the touch panel 15 and the second LCD 12 do not need to have the same resolution.

Figure 5:
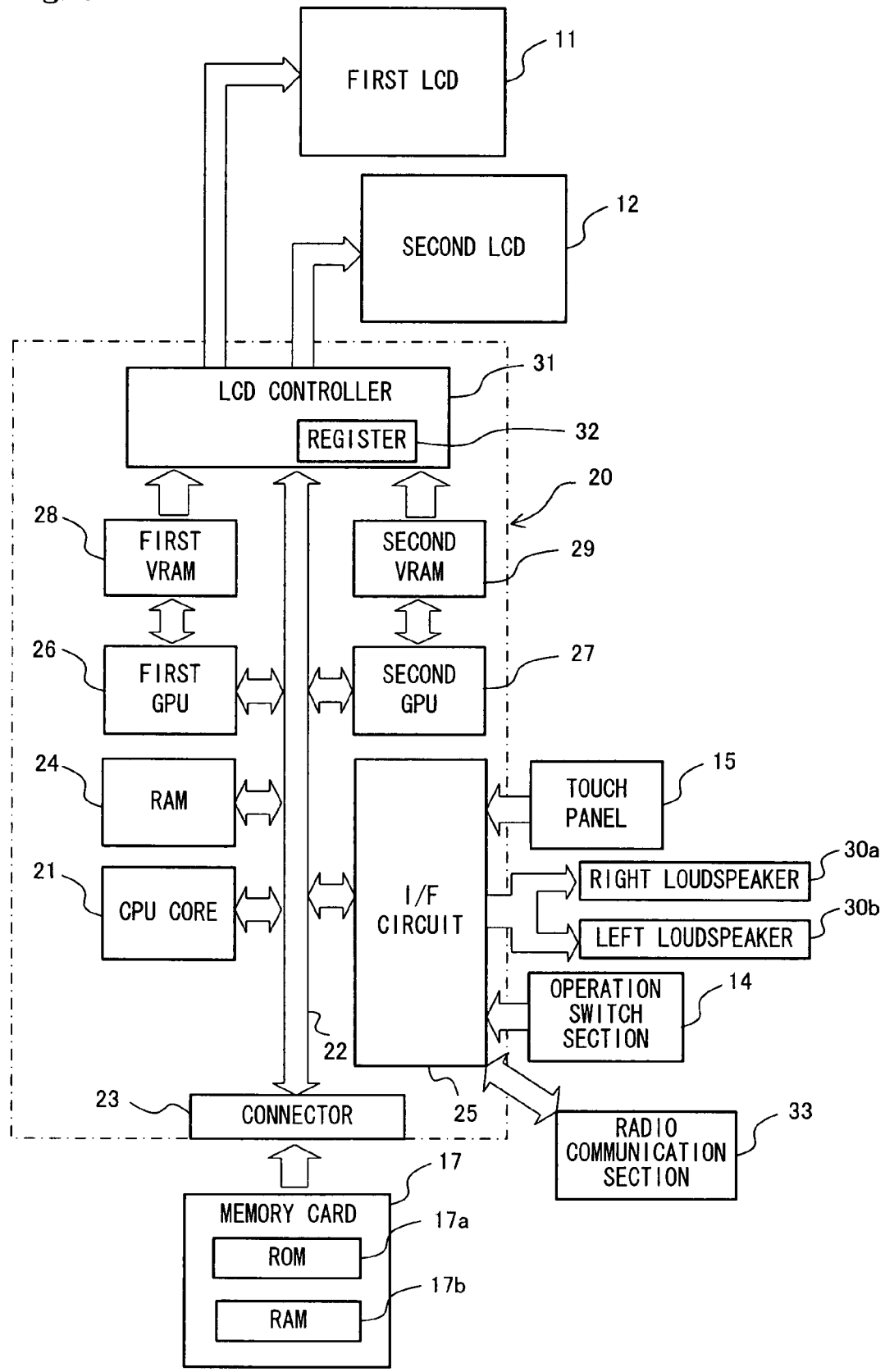
FIG. 5 is a diagram showing functional blocks of a game apparatus.

Next, an internal structure of the game apparatus 10 will be described with reference to FIG. 5. In FIG. 5, a CPU core 21 is provided on an electronic circuit board 20 which is housed in the housing 13. A connector 23, an input/output interface circuit (denoted as an I/F circuit in FIG. 2) 25, a first GPU (Graphics Processing Unit) 26, a second GPU 27, a RAM 24, and an LCD controller 31 are connected via a bus 22 to the CPU core 21. The memory card 17 is detachably connected to the connector 23. The memory card 17 comprises the ROM 17a which stores the data 1 to 4 of FIG. 1 and the RAM 17b which stores rewritable backup data. The game program (contents 1) stored in the ROM 17a of the memory card 17 is loaded into the RAM 24, and the game program loaded in the RAM 24 is executed by the CPU core 21. In addition to the game program, the RAM 24 stores temporary data obtained by the CPU core 21 executing the game program, data for generating a game image, and the like.

The operation switch section 14, the touch panel 15, the right loudspeaker 30a, the left loudspeaker 30b, and the microphone 33 are connected to the I/F circuit 25. The right loudspeaker 30a and the left loudspeaker 30b are provided inside under the sound holes 18a and 18b, respectively. The CPU core 21 outputs audio data (sound source) stored in the RAM 24 or the like from the I/F circuit 25 via an A/D conversion circuit (not shown), an amplifier (not shown) and the like to the loudspeakers 30a and 30b. Thereby, the loudspeakers 30a and 30b output sound represented by the audio data. Audio data indicating audio input to the microphone 33 is stored via the I/F circuit 25 to the RAM 24.

A first VRAM (Video RAM) 28 is connected to the first GPU 26, and a second VRAM 29 is connected to the second GPU 27. The first GPU 26 generates a first game image based on data for generating a game image, the data being stored in the RAM 24, and draws the first game image into the first VRAM 28, in accordance with an instruction from the CPU core 21. Similarly, the second GPU 27 generates a second game image and draws the second game image into the second VRAM 29, in accordance with an instruction from the CPU core 21. The first VRAM 28 and the second VRAM 29 are connected to the LCD controller 31.

The LCD controller 31 includes a register 32. The register 32 stores a value of 0 or 1 in accordance with an instruction from the CPU core 21. When the value of the register 32 is 0, the LCD controller 31 outputs the first game image drawn in the first VRAM 28 to the first LCD 11, and outputs the second game image drawn in the second VRAM 29 to the second LCD 12.

The above-described configuration of the game apparatus 10 is only for illustrative purposes. The authentication apparatus can be implemented by any computer system which reproduces and/or executes the contents 1.

Figure 6:
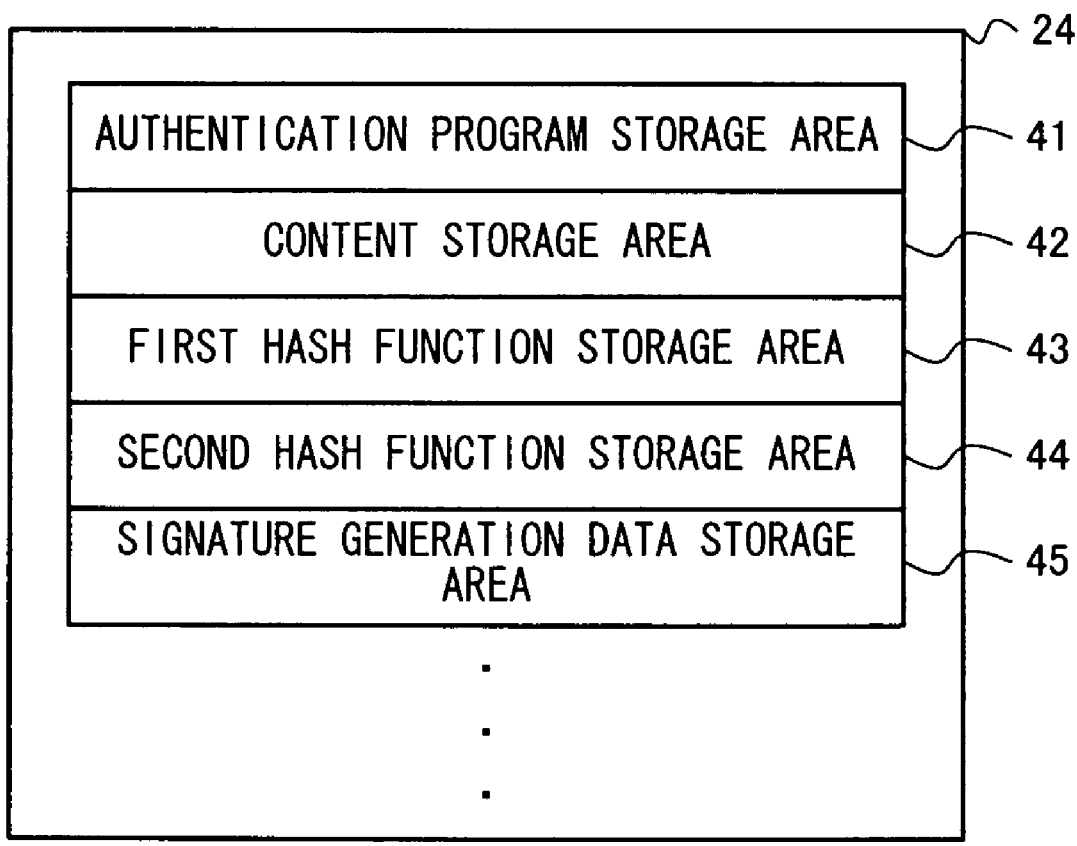
FIG. 6 is a diagram showing main data stored in a RAM 24 of the game apparatus.

Hereinafter, an authentication process performed by the game apparatus 10 will be described in detail. FIG. 6 is a diagram showing main data stored in the RAM 24 of the game apparatus 10. In FIG. 6, the RAM 24 includes an authentication program storage area 41, a content storage area 42, a first hash function storage area 43, a second hash function storage area 44, and a digital signature generation data storage area 45.

The authentication program storage area 41 is used to store an authentication program for executing the authentication process with respect to the contents 1. The authentication program is previously stored, but is not a program obtained from the memory card 17.

The content storage area 42 is used to store a part of the contents 1 stored in the memory card 17. The game apparatus 10 reads out a required data portion of the contents 1 as appropriate into the content storage area 42, and executes a game process using the read data portion.

The first hash function storage area 43 is used to store the first hash function. The second hash function storage area 44 is used to store the second hash function. The data of the first and second hash function is previously stored as with the authentication program. Note that, when the first hash function and the second hash function are the same hash function, only one of the first and second hash function storage areas 43 and 44 may be provided.

The digital signature generation data storage area 45 is used to store data required for authentication using the digital signature 4, i.e., the data of the digital signature generating hash function and the public key. The public key is paired with the encryption key stored in the write apparatus 6. Note that the data required for authentication using the digital signature 4 is previously stored as with the authentication program.

Note that the RAM 24 is used to store various data (described below) used for the authentication process in addition to the data stored in the storage areas 41 to 45.

Next, the authentication process will be described in detail. In this embodiment, the authentication process includes an authentication process (first authentication process) executed when the memory card 17 is attached to the game apparatus 10, and processes (second and third authentication processes) executed when the game apparatus 10 reads out the data of the contents 1 from the memory card 17. Specifically, the first authentication process is executed in response to attachment of the memory card 17 to the game apparatus 10. The second and third authentication processes are executed when the game apparatus 10 reads out the data of the contents 1 from the memory card 17.

Figure 7:
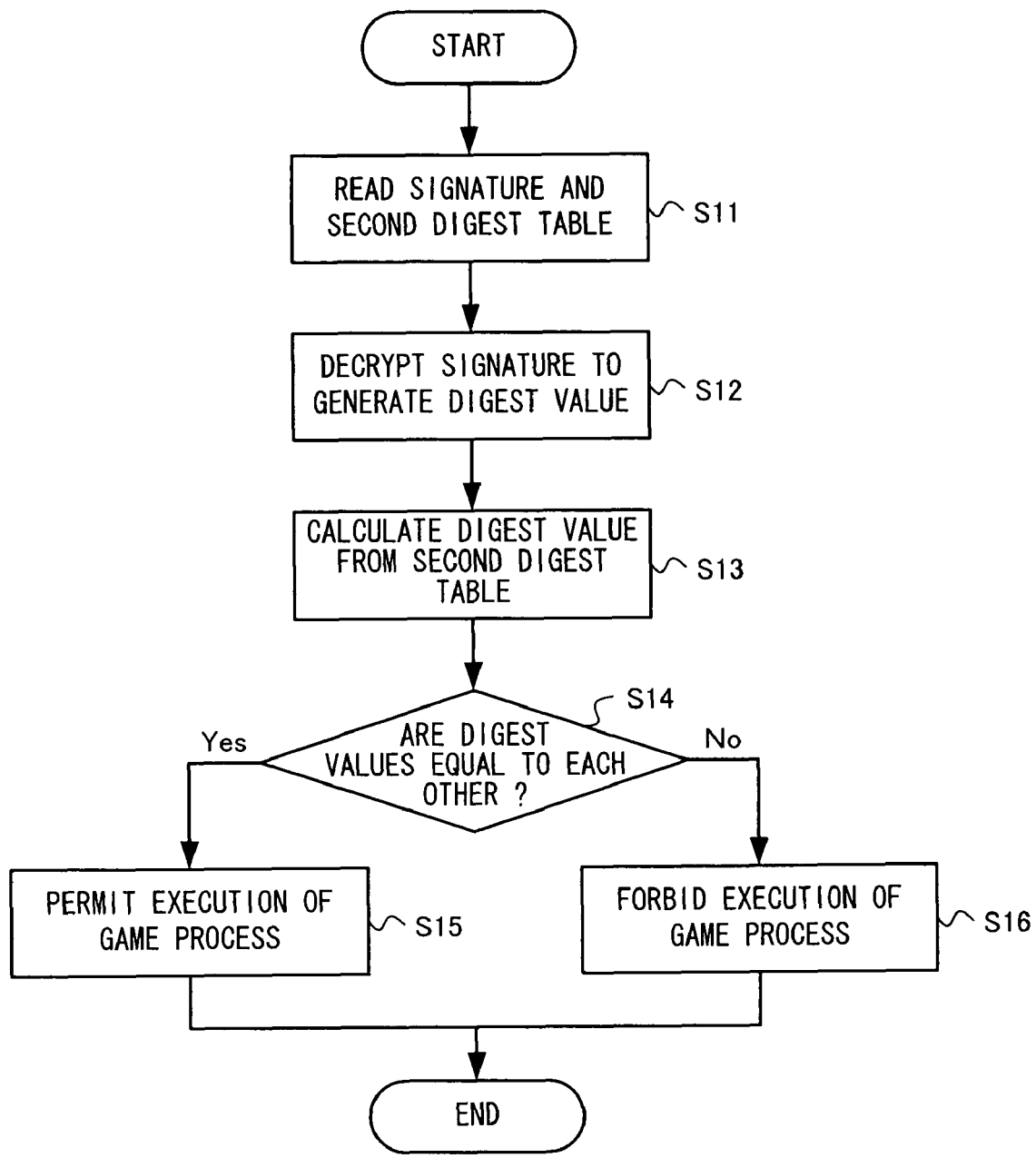
FIG. 7 is a flowchart showing a first authentication process executed in the game apparatus.

FIG. 7 is a flowchart showing the first authentication process executed in the game apparatus 10. The first authentication process of FIG. 7 is executed in response to attachment of the memory card 17 to the game apparatus 10. The first authentication process is executed independently of whether or not the contents 1 stored in the memory card 17 are provided by an authentic provider. Note that the game apparatus 10 does not read out the contents 1 until reading of the contents 1 is permitted in the first authentication process.

In step S11 of FIG. 7, the CPU core 21 reads out the second digest table 3 and the digital signature 4 from the memory card 17 attached to the game apparatus 10 into the RAM 24. In steps S12 to S16 executed after step S11, the first authentication process, i.e., an authentication process for the contents 1 using the second digest table 3 and the digital signature 4, is performed.

In the following step S12, the CPU core 21 decrypts the read digital signature 4 to generate a digest value. The digital signature 4 is decrypted using the data of the public key stored in the digital signature generation data storage area 45. Further, in step S13, a digest value is calculated from the read second digest table 3. The digest value is calculated by applying a digital signature generating hash function to the second digest table 3. The digital signature generating hash function is stored in the digital signature generation data storage area 45. Note that, in another embodiment, the processes of steps S12 and S13 may be executed in any order or in parallel.

In step S14, the CPU core 21 determines whether or not the digest value generated in step S12 is equal to the digest value generated in step S13. When these two digest values are equal to each other, it is determined that authentication is successful in the first authentication process, and a process of step S15 is executed. On the other hand, when the two digest values are not equal to each other, it is determined that authentication is not successful in the first authentication process, and a process of step S16 is executed.

In step S15, reading of the contents 1 (execution of the game process) is permitted, and the CPU core 21 ends the first authentication process of FIG. 7. Thereby, in step S15 and later, the game process which uses the contents 1 is executed. In step S15, the authenticity of the contents 1 is verified by the first authentication process. Note that, in this embodiment, even when the authenticity of the contents 1 is verified by the first authentication process, the authenticity of the contents 1 may not be verified in the second authentication process and the third authentication process which are executed after the first authentication process.

On the other hand, in step S16, reading of the contents 1 (execution of the game process) is forbidden. In this case, the game program included in the contents 1 cannot be executed, and therefore, the CPU core 21 ends the process of FIG. 7. Note that, in step S16, the CPU core 21 may display a message indicating that the contents 1 in the memory card 17 are not authentic (e.g., "this memory card cannot be used", etc.) on the screen of the first LCD 11 or the second LCD 12.

Note that, after the end of the first authentication process of FIG. 7, the CPU core 21 may delete the digest value calculated from the second digest table 3 and the data of the digital signature 4 from the RAM 24. Also, in this embodiment, the second digest table 3 is held in the RAM 24 since the second digest table 3 is used in the second authentication process described below.

In the first authentication process, when the authenticity of the contents 1 is verified, the CPU core 21 proceeds to perform a game process by performing a process of reading out and executing the game program included in the contents 1, a process of reading out game data (image data, sound data, etc.) included in the contents 1, or the like. Here, data of the contents 1 is read out on a block-by-block basis into the game apparatus 10. When one block of data portion is read out from the contents 1, the second authentication process and the third authentication process are executed. Hereinafter, the second authentication process and the third authentication process will be described in detail.

Figure 8:
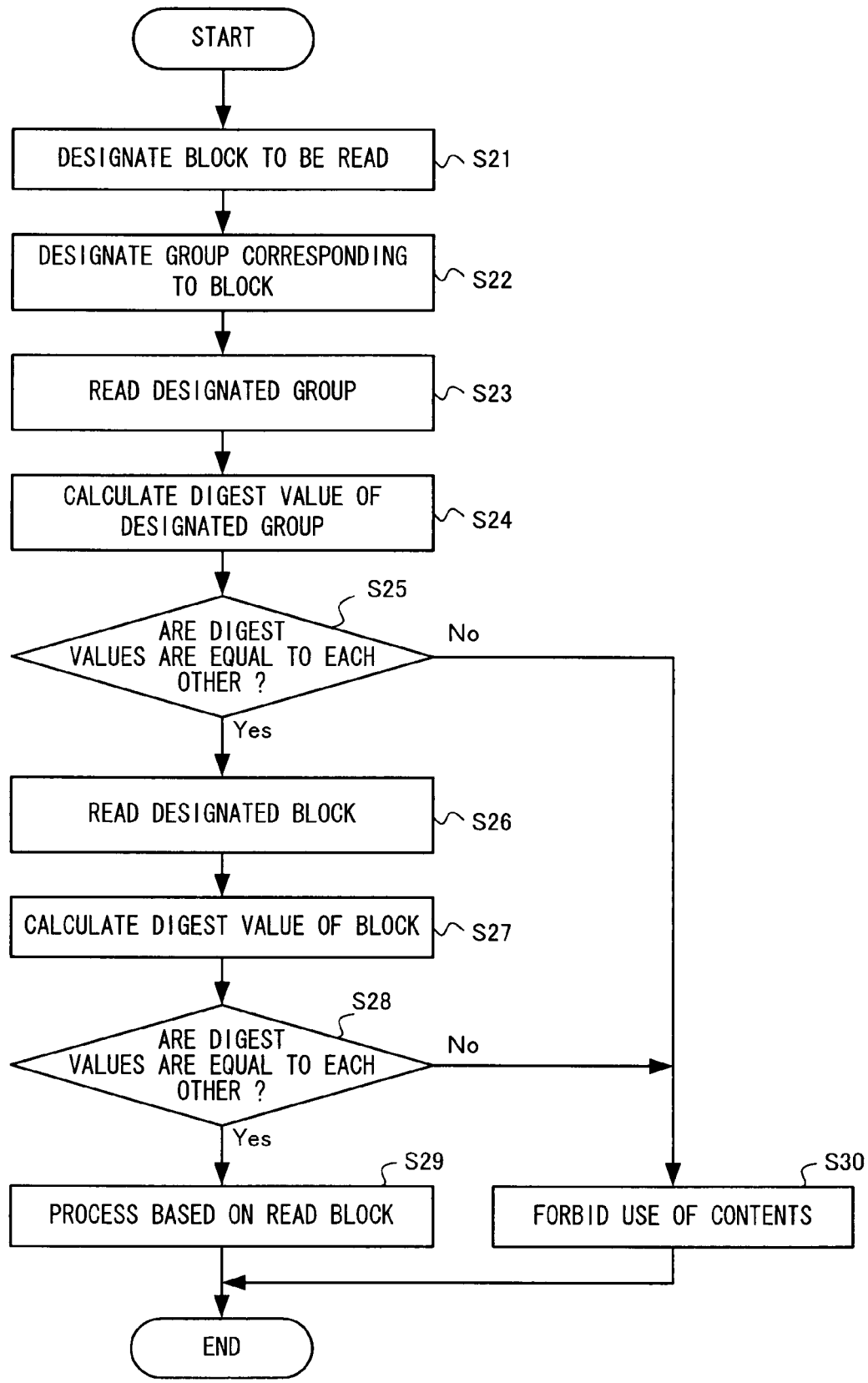
FIG. 8 is a flowchart showing second and third authentication processes executed in the game apparatus.

FIG. 8 is a flowchart showing the second and third authentication processes executed in the game apparatus 10. The second and third authentication processes of FIG. 8 are executed in response to reading of one block from the contents 1 by the game apparatus 10. Note that the game apparatus 10 does not use the contents 1, i.e., the game process based on the contents 1 is not executed, until the use of the contents 1 is permitted in the second and third authentication processes.

In step S21 shown in FIG. 8, the CPU core 21 designates a block to be read out of the data portions (content data portions) of the contents 1. Note that a content data portion to be read out is determined by the game process which has been so far executed. Of the blocks in the contents 1, a block including a content data portion to be first read out is previously determined. When the game apparatus 10 first reads out the contents 1, the CPU core 21 designates the previously determined block.

In steps S22 to S25 after step S21, the second authentication process is executed. In the second authentication process, of the groups included in the first digest table 2, the authenticity of primary digest values included in a group corresponding to the block designated by the step S21 is verified.

In step S22, the CPU core 21 designates a group corresponding to the block designated by step S21. Specifically, a group including primary digest values corresponding to a content data portion included in the block is designated. For example, when a block A shown in FIG. 1 is designated, a group including primary digest values A to D is designated as a group corresponding to the block A.

In the following step 23, the CPU core 21 reads out the primary digest values of the designated group from the memory card 17. The data thus read out is stored into the RAM 24. Note that, in step S23, the data of a group which has been stored in the RAM 24 by the previous step S23 is overwritten with the data of a new group in the RAM 24. In other words, only the data of the latest group is stored in the RAM 24, and therefore, the RAM 24 may have a storage area having a capacity corresponding to one group, as a storage area for the first digest table 2.

Further, in step S24, the primary digest values of the designated group are used to calculate a secondary digest value corresponding to the group. The secondary digest value is calculated by applying the second hash function to the primary digest values included in the designated group. The second hash function is stored in the second hash function storage area 44.

In step S25, the CPU core 21 determines whether or not the secondary digest value calculated in step S24 is equal to a secondary digest value corresponding to the designated group. Note that the latter secondary digest value is obtained from the second digest table 3 which has already been read out into the RAM 24 in step S11 of FIG. 7. For example, when the group including the primary digest values A to D of FIG. 1 has been designated, the secondary digest value corresponding to the group is the secondary digest value a of FIG. 1. When it is determined in step S25 that these two digest values are equal to each other, it is determined that authentication is successful in the second authentication process, and a process of step S26 is executed. On the other hand, when the two digest values are not equal to each other, it is determined that authentication is not successful in the second authentication process, and a process of step S30 is executed.

When authentication is successful in the second authentication process, the third authentication process is executed in steps S26 to S29. In the third authentication process, the authenticity of the block designated by step S21 of the blocks included in the contents 1 is verified.

In step S26, the CPU core 21 reads out the designated block (a content data portion included in the block) from the memory card 17. The data thus read out is stored into the content storage area 42 of the RAM 24. Although the content storage area 42 may be capable of storing at least one block of the contents 1, the content storage area 42 may be capable of storing a plurality of blocks (e.g., two blocks) of the contents 1.

In the following step S27, a primary digest value corresponding to the designated block is calculated. The digest value is calculated by applying the first hash function to the content data portion included in the designated block. The first hash function is stored in the first hash function storage area 43.

In step S28, the CPU core 21 determines whether or not the primary digest value calculated by step S27 is equal to a primary digest value corresponding to the designated block. Note that the latter primary digest value is obtained from the first digest table 2 which has already been read out into the RAM 24 in step S23. When these two digest values are equal to each other, it is determined that authentication is successful in the third authentication process, and a process of step S29 is executed. On the other hand, when the two digest values are not equal to each other, it is determined that authentication is not successful in the third authentication process, and a process of step S30 is executed.

In step S29, the CPU core 21 permits the use of the read block, and executes a process based on the block. For example, if the read block is a game program, the CPU core 21 executes the game program to execute a game process. Note that, in this embodiment, the contents 1 may be encrypted on, for example, a block-by-block basis. When the contents 1 are encrypted, the encrypted data of the contents 1 is decrypted in step S29 (or step S26). After step S29, the CPU core 21 ends the process of FIG. 8. Thereafter, when the contents 1 need to be read in a game process, the process of FIG. 8 is executed again. The process of FIG. 8 is executed every time a block of the contents 1 is read out.

Note that, in another embodiment, the first and second digest tables 2 and 3 stored in the memory card 17 may be encrypted as with the contents 1. In this case, the CPU core 21 decrypts the first digest table 2 in step S23. Also, the CPU core 21 decrypts the second digest table 3 in step S11. The data 1 to 3 may be encrypted using different schemes or keys.

On the other hand, in step S30, the use of the contents 1 is forbidden, so that the CPU core 21 ends the process of FIG. 8. Note that a message indicating that the contents 1 of the memory card 17 are not authentic may be displayed on the screen of the first LCD 11 or the second LCD 12 in step S30 as in step S16. In addition, after step S30, the CPU core 21 suspends a game process even during execution of the game process.

As described above, according to this embodiment, in the first to third authentication processes, not the whole first digest table 2 needs to be read out into the RAM 24, and the second digest table 3 and only one group of the first digest table 2 need to be read out for the purpose of authentication. Therefore, a memory area required for the authentication process can be reduced as compared to conventional methods, in which the whole first digest table 2 is read out.

Note that, when the content storage area 42 can store data of a plurality of blocks of the contents 1, the second and third authentication processes may not be performed for data of the contents 1 which has already been stored in the content storage area 42. Specifically, in the process of FIG. 8, the CPU core 21 may determine whether or not a block designated by step S21 has already been stored in the content storage area 42, before the process of step S22. When the block has already been stored, the processes of steps S22 to S28 are skipped and the process of step S29 may be executed.

Note that, in the above-described embodiment, the digital signature generating hash function may be preferably a hash function which is stronger than the first and second hash functions (more difficult to break, i.e., a higher level of security). This is because the digital signature generating hash function is used only once when the memory card 17 is attached, and therefore, a function in which an importance is put on security is preferably employed as the digital signature generating hash function. Note that the security level of a hash function is determined, depending on the number of bits in the process of calculating a digest value, the number of bits of a digest value, whether or not a digest value is encrypted, or the like. Specifically, a hash function having a relatively large number of bits in the digest value calculating process or a relatively large number of bits of a digest value, is stronger than a hash function having a relatively smaller one. Also, a hash function with encryption (a hash function with a key) is considered to be stronger than the hash function without encryption.

In the above-described embodiment, it is assumed that the first hash function and the second hash function are the same. In another embodiment, the first hash function and the second hash function may be different from each other so as to reduce the processing amounts of the second authentication process and the third authentication process. In this case, as the second hash function, a hash function having a smaller processing amount for calculating a digest value than that of the first hash function is preferably used. In other words, as the first hash function, a hash function stronger than the second hash function is preferably used. For example, in another embodiment, SHA-1 may be used as the first hash function, while MD-5 may be used as the second hash function. Note that, in this case, the digital signature generating hash function is preferably stronger than the first and second hash functions, and therefore, for example, SHA-256 is used as the digital signature generating hash function.

A reason why a hash function stronger than the second hash function is used as the first hash function is that the contents 1 are more easily tampered when the first hash function is broken than when the second hash function is broken. The first hash function indicates a relationship between the contents 1 and the primary digest values. Therefore, when the first hash function is broken, the contents 1 can be directly tampered. However, even when the second hash function is broken, the contents 1 cannot be directly tampered. Therefore, when the processing amount of either the second authentication process or the third authentication process is desired to be reduced, it is preferably to reduce the security level of the second hash function.

It has been described in the embodiment above that the data structure of FIG. 1, which is stored in a storage medium, such as a memory card or the like, is provided to the content user. In another embodiment, the data structure of FIG. 1 may be provided to the content user via communication on a network. For example, in certain example embodiments may include a system in which an authentication apparatus (e.g., the game apparatus 10) can communicate via a network with a server apparatus storing the data structure. Note that the operation of the authentication apparatus in this system is similar to that of the above-described embodiment, except that a process of receiving data from the server apparatus is performed instead of the process of reading out data from a memory card.

Certain example embodiments may include, for example, a system which provides a game program to the user, a game apparatus which is used in the system, and the like, for the purpose of efficiently performing the checking process, reducing a memory capacity required for authentication, or the like.

While the invention has been described in detail, the foregoing description is in all aspects illustrative and not restrictive. It is understood that numerous other modifications and variations can be devised without departing from the scope of the invention.

What is claimed is:

1. A method for use in an authentication apparatus for authenticating content data, wherein the authentication apparatus can access a storage medium configured to store: the content data, a first digest table including stored primary digest values which are digest values corresponding to content data portions of the content data, a second digest table including stored secondary digest values which are digest values corresponding to first digest table portions constituting the first digest table, each one of the first digest table portions including a plurality of stored primary digest values and a digital signature generated from at least a secondary digest value included in the second digest table, the method comprising:

reading out the second digest table and the digital signature from the storage medium into a memory of the authentication apparatus; and verifying the authenticity of the content data using the digital signature read out into the memory and a stored secondary digest value included in the second digest table read out into the memory;

designating a content data portion via a random access method in accordance with a computer process;

calculating a secondary digest value from a group of primary digest values that includes a stored primary digest value that corresponds to the designated content data portion;

checking the calculated secondary digest value against a stored secondary digest value to verify the authenticity of the designated content data portion; reading out the designated content data portion into a content storage memory;

calculating a calculated primary digest value from the designated content data portion, when the check of the calculated secondary digest value against a stored secondary digest value is successfully verified; and checking the calculated primary digest value against the stored primary digest value to verify the authenticity of the designated content data portion.

2. The authentication method according to claim 1, wherein verifying the authenticity of the content data using the digital signature is executed after the authentication apparatus and the storage medium become accessible and before checking the calculated secondary digest value against a stored secondary digest value to verify the authenticity of the designated content data portion.

3. The authentication method according to claim 1, wherein a hash function for calculating the calculated primary digest value is the same as a hash function for calculating the calculated secondary digest value.

4. The authentication method according to claim 3, wherein the digital signature is generated based on a digest value corresponding to a plurality of secondary digest values included in the second digest table, and a hash function for calculating the digest value has a higher security level than that of the hash function for calculating the calculated primary digest value from the content data portion.

5. The authentication method according to claim 1, wherein a hash function for calculating the calculated secondary digest value has a smaller processing amount than that of a hash function for calculating the calculated primary digest value.

6. The authentication method according to claim 1, wherein verifying the authenticity of the content data using the digital signature read out into the memory and the stored secondary digest value included in the second digest table read out into the memory uses a hash function that has a higher security level than a hash function used for calculating the calculated secondary digest value and a hash function for calculating the calculated primary digest.

7. The method of claim 1, further comprising skipping checking the calculated secondary digest value against a stored secondary digest value to verify the authenticity of the designated content data portion and further skipping checking the calculated primary digest value against the stored primary digest value to verify the authenticity of the designated content data portion when the designated content data portion exists in the content storage memory.

8. The method of claim 1, further comprising deleting the digital signature from the memory after the authenticity of the content data has been verified.

9. The method of claim 1, further comprising reading out the group that includes the plurality of stored primary digest values that correspond to the designated content data portion from the storage medium into the memory of the authentication apparatus.

10. The medium of claim 1, wherein the content data portions include at least some data and/or instructions that are configured to be loaded into said random access memory.

11. An authentication apparatus for authenticating content data, wherein the authentication apparatus can access a storage medium configured to store: the content data, a first digest table including stored primary digest values which are digest values corresponding to content data portions constituting the content data, a second digest table including stored secondary digest values which are digest values corresponding to first digest table portions constituting the first digest table, each of the first digest table portions including a plurality of stored primary digest values, and a digital signature generated from at least a secondary digest value included in the second digest table, the apparatus comprising:

a processing system configured to cause:
reading out the second digest table and the digital signature from the storage medium into a memory of the authentication apparatus; and
verifying the authenticity of the content data using the digital signature read out into the memory and a stored secondary digest value included in the second digest table read out into the memory;
designating a content data portion via a random access method in accordance with a computer process;
calculating a secondary digest value from a group that includes a plurality of stored primary digest values, one of the stored primary values of the group corresponding to the designated content data portion;
reading out the designated content data portion into a content storage memory;
checking the calculated secondary digest value against a stored secondary digest value to verify the authenticity of the designated content data portion;
calculating a primary digest value from the designated content data portion, when the check of the calculated secondary digest value against a stored secondary digest value is successfully verified; and
checking the calculated primary digest value against a stored primary digest value to verify the authenticity of the designated content data portion.

12. A non-transitory computer readable storage medium storing an authentication process program executed by a computer of an authentication apparatus for authenticating content data, wherein the authentication apparatus is configured to access a storage medium storing: the content data, a first digest table including stored primary digest values which are digest values corresponding to content data portions constituting the content data, a second digest table including stored secondary digest values which are digest values corresponding to first digest table portions constituting the first digest table, each of the first digest table portions including a plurality of stored primary digest values, and a digital signature generated using a secondary digest value included in the second digest table, the authentication process program causes the computer to execute:
reading out the second digest table and the digital signature from the storage medium into a memory of the authentication apparatus; and
verifying the authenticity of the content data using the digital signature read out into the memory and a secondary digest value included in the second digest table read out into the memory;
designating a content data portion via a random access method in accordance with a computer process;
calculating a secondary digest value from a group of primary digest values that includes a stored primary digest value that corresponds to the designated content data portion;
reading out the designated content data portion into a content storage memory;
checking the calculated secondary digest value against a stored secondary digest value to verify the authenticity of the group of primary digest values;
calculating a primary digest value from the designated content data portion, when the check of the calculated secondary digest value against a stored secondary digest value is successfully verified; and
checking the calculated primary digest value against the stored primary digest value to verify the authenticity of the designated content data portion.

13. A method for use in an authentication apparatus for authenticating content data, wherein the authentication apparatus can access a storage medium configured to store: the content data, a first digest table including stored primary digest values which are digest values corresponding to content data portions of the content data, a second digest table including stored secondary digest values which are digest values corresponding to first digest table portions constituting the first digest table, each of the first digest table portions including a plurality of stored primary digest values and a digital signature generated from at least a secondary digest value included in the second digest table, the method comprising:
reading out the second digest table and the digital signature from the storage medium into a memory of the authentication apparatus; and
verifying the authenticity of the content data using the digital signature read out into the memory and a stored secondary digest value included in the second digest table read out into the memory;
designating a content data portion;
reading out the designated content data portion into a content storage memory;
activating a first mode when the designated content data portion does exist in the content storage memory and activating a second mode when the designated content data does not exist in the content storage memory;
calculating a calculated secondary digest value from a group that includes a plurality of stored primary digest values, one of the stored primary values of the group corresponding to the designated content data portion;
checking the calculated secondary digest value against a stored secondary digest value to verify the authenticity of the designated content data portion only when the second mode is activated;
calculating a primary digest value from the designated content data portion when the check of the calculated secondary digest value against a stored secondary digest value is successfully verified; and
checking the calculated primary digest value against a stored primary digest value to verify the authenticity of the designated content data portion only when the second mode is activated.

14. An authentication apparatus for authenticating content data, wherein the authentication apparatus can access a storage medium configured to store: the content data, a first digest table including stored primary digest values which are digest values corresponding to content data portions constituting the content data, a second digest table including stored secondary digest values which are digest values corresponding to first digest table portions constituting the first digest table, each of the first digest table portions including a plurality of stored primary digest values, and a digital signature generated using a secondary digest value included in the second digest table, the apparatus comprising:
a processing system configured to cause:
reading out the second digest table and the digital signature from the storage medium into a memory of the authentication apparatus;

verifying the authenticity of the content data using the digital signature read out into the memory and a stored secondary digest value included in the second digest table read out into the memory;

designating a content data portion;

reading out the designated content data portion into a content storage memory;

activating a first mode when the designated content data portion does exist in the content storage memory and activating a second mode when the designated content data does not exist in the content storage memory;

calculating a secondary digest value from a group of primary digest values that includes a stored primary digest value that corresponds to the designated content data portion;

checking the calculated secondary digest value against a stored secondary digest value to verify the authenticity of the designated content data portion only when the second mode is activated;

calculating a primary digest value from the designated content data portion when the check of the calculated secondary digest value against a stored secondary digest value is successfully verified; and checking the calculated primary digest value against the stored primary digest value to verify the authenticity of the designated content data portion only when the second mode is activated.

15. A non-transitory computer readable storage medium storing an authentication process program executed by a computer of an authentication apparatus for authenticating content data, wherein the authentication apparatus is configured to access a storage medium storing: the content data, a first digest table including stored primary digest values which are digest values corresponding to content data portions constituting the content data, a second digest table including stored secondary digest values which are digest values corresponding to first digest table portions constituting the first digest table, each of the first digest table portions including a plurality of stored primary digest values, and a digital signature generated using a secondary digest value included in the second digest table, the authentication process program causes the computer to execute:

reading out the second digest table and the digital signature from the storage medium into a memory of the authentication apparatus;

verifying the authenticity of the content data using the digital signature read out into the memory and a stored secondary digest value included in the second digest table read out into the memory;

designating a content data portion;

reading out the designated content data portion into a content storage memory;

activating a first mode when the designated content data portion does exist in the content storage memory and activating a second mode when the designated content data does not exist in the content storage memory;

calculating a secondary digest value from a group of primary digest values that includes a stored primary digest value that corresponds to the designated content data portion;

checking the calculated secondary digest value against a stored secondary digest value to verify the authenticity of the designated content data portion only when the second mode is activated;

calculating a primary digest value from the designated content data portion when the check of the calculated secondary digest value against a stored secondary digest value is successfully verified; and checking the calculated primary digest value against a stored primary digest value to verify the authenticity of the designated content data portion only when the second mode is activated.

16. An authentication system for authenticating content data, wherein the authentication system can access a storage medium configured to store: the content data, a first digest table including stored primary digest values which are digest values corresponding to content data portions constituting the content data, a second digest table including stored secondary digest values which are digest values corresponding to first digest table portions constituting the first digest table, each of the first digest table portions including a plurality of stored primary digest values, and a digital signature generated from at least a secondary digest value included in the second digest table, the system comprising:

a processing system configured to cause:

reading out the second digest table and the digital signature from the storage medium into a memory of the authentication apparatus; and verifying the authenticity of the content data using the digital signature read out into the memory and a stored secondary digest value included in the second digest table read out into the memory;

designating a content data portion;

reading out the designated content data portion into a content storage memory;

activating a first mode when the designated content data portion does exist in the content storage memory and activating a second mode when the designated content data does not exist in the content storage memory;

calculating a secondary digest value from a group of primary digest values that includes a stored primary digest values that corresponds to the designated content data portion;

checking the calculated secondary digest value against a stored secondary digest value to verify the authenticity of the designated content data portion only when the second mode is activated;

calculating a primary digest value from the designated content data portion when the check of the calculated secondary digest value against a stored secondary digest value is successfully verified; and checking the calculated primary digest value against a stored primary digest value to verify the authenticity of the designated content data portion only when the second mode is activated.

17. An authentication system for authenticating content data, wherein the authentication system can access a storage medium configured to store: the content data, a first digest table including stored primary digest values which are digest values corresponding to content data portions constituting the content data, a second digest table including stored secondary digest values which are digest values corresponding to first digest table portions constituting the first digest table, each of the first digest table portions including a plurality of stored primary digest values, and a digital signature generated from at least a secondary digest value included in the second digest table, the system comprising:

a processing system configured to cause:

reading out the second digest table and the digital signature from the storage medium into a memory of the authentication apparatus;

verifying the authenticity of the content data using the digital signature read out into the memory and a secondary digest value included in the second digest table read out into the memory;

designating a content data portion via a random access method in accordance with a computer process;

reading out the designated content data portion into a content storage memory;

calculating a secondary digest value from a group of primary digest values that includes a stored primary digest value that corresponds to the designated content data portion;

checking the calculated secondary digest value against a stored secondary digest value to verify the authenticity of the croup of primary digest values;

calculating a primary digest value from the designated content data portion, when the check of the calculated secondary digest value against a stored secondary digest value is successfully verified; and checking the calculated primary digest value against a stored primary digest value to verify the authenticity of the designated content data portion.

18. A non-transitory computer readable storage medium for, in use, being accessed by an authentication apparatus that authenticates content data, wherein the authentication apparatus can access said storage medium, the storage medium storing a digital data structure including: the content data, a first digest table including stored primary digest values which are digest values corresponding to content data portions of the content data, a second digest table including stored secondary digest values which are digest values corresponding to first digest table portions constituting the first digest table, each one of the first digest table portions including a plurality of stored primary digest values, and a digital signature generated from at least a secondary digest value included in the second digest table, the storage medium being configured to provide the second digest table and the digital signature from the storage medium, the digital signature being configured to verify the authenticity of the content data using the digital signature and at least one stored secondary digest value included in the second digest table, the storage medium being further configured to provide to the authentication apparatus a content data portion via a random access method in accordance with a computer process, the stored secondary digest value having been calculated from a group of primary digest values that includes a stored primary digest value that corresponds to the designated content data portion, the storage medium providing the stored secondary digest value for use in checking against the calculated secondary digest value to verify the authenticity of the content data portion, the storage medium providing the stored primary digest value for use in checking against a calculated primary digest value after the check of the calculated secondary digest value against a stored secondary digest value is successfully verified, and the stored primary digest value being configured to check against the calculated primary digest value to verify the authenticity of the content data portion.

19. A method for use in an authentication apparatus for authenticating content data, wherein the authentication apparatus can access a storage medium configured to store: the content data, a first digest table including stored primary digest values which are digest values corresponding to content data portions of the content data, a second digest table including stored secondary digest values which are digest values corresponding to first digest table portions constituting the first digest table, each one of the first digest table portions including a plurality of stored primary digest values and a digital signature generated from at least a secondary digest value included in the second digest table, the method comprising:

reading out the second digest table and the digital signature from the storage medium into a memory of the authentication apparatus; and verifying the authenticity of the content data using the digital signature read out into the memory and a stored secondary digest value included in the second digest table read out into the memory;

accessing a group of primary digest values that includes a stored primary digest value that corresponds to a content data portion that is designated via a random access method in accordance with a computer process;

calculating a secondary digest value based on the group of primary digest values;

checking the calculated secondary digest value against a stored secondary digest value to verify the authenticity of the content data portion that is designated; reading out the content data portion that is designated into a content storage memory;

calculating a calculated primary digest value from the content data portion that is designated, when the check of the calculated secondary digest value against a stored secondary digest value is successfully verified; and checking the calculated primary digest value against the stored primary digest value to verify the authenticity of the content data portion that is designated.

* * * * *